United States Patent
Chen

(10) Patent No.: US 8,862,117 B2
(45) Date of Patent: Oct. 14, 2014

(54) CELLPHONE CONTROLLABLE CAR INTRUSION RECORDING AND MONITORING REACTION SYSTEM

(75) Inventor: Ieon C Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 0 days.

(21) Appl. No.: 13/461,124

(22) Filed: May 1, 2012

(65) Prior Publication Data

US 2013/0295911 A1    Nov. 7, 2013

(51) Int. Cl.
*H04M 3/00*    (2006.01)
*H04L 29/08*    (2006.01)
*H04W 4/04*    (2009.01)

(52) U.S. Cl.
CPC .............. *H04L 67/12* (2013.01); *H04W 4/046* (2013.01)
USPC ..................... 455/420; 455/414.1; 455/412.1; 455/418; 455/419

(58) Field of Classification Search
CPC ......... H04L 67/12; H04L 67/14; H04M 1/00; H04W 12/12; H04W 4/046; H04N 55/765; H04N 5/77
USPC .................... 455/420, 414.1, 412.1, 418, 419
See application file for complete search history.

(56) References Cited

U.S. PATENT DOCUMENTS

| | | |
|---|---|---|
| D334,560 S | 4/1993 | Wilson |
| 5,347,211 A | 9/1994 | Jakubowski |
| D377,622 S | 1/1997 | Chen |
| 5,635,841 A | 6/1997 | Taylor |
| 5,767,681 A | 6/1998 | Huang |
| 6,000,413 A | 12/1999 | Chen |
| 6,362,730 B2 | 3/2002 | Razavi et al. |
| 6,499,385 B2 | 12/2002 | Protti |
| 6,687,584 B2 | 2/2004 | Andreasen |
| 6,868,369 B2 | 3/2005 | Huang |
| 6,940,270 B2 | 9/2005 | Chen |
| 6,941,203 B2 | 9/2005 | Chen |
| 6,947,816 B2 | 9/2005 | Chen |
| D510,287 S | 10/2005 | Chen |
| 6,968,733 B2 | 11/2005 | Andreasen |
| 7,030,742 B2 | 4/2006 | Treadway |
| 7,062,300 B1 | 6/2006 | Kim |
| 7,064,657 B2 * | 6/2006 | Becker et al. .............. 340/426.1 |
| 7,085,680 B2 | 8/2006 | Huang |

(Continued)

FOREIGN PATENT DOCUMENTS

WO    WO 2005059858 A1 *    6/2005

*Primary Examiner* — Khai M Nguyen
(74) *Attorney, Agent, or Firm* — Stetina Brunda Garred & Brucker

(57) ABSTRACT

A cellphone controllable car intrusion system is provided. This system includes a vehicle OEM system, including an electronic control unit (ECU), a diagnostic port, a plurality of OEM cameras, a plurality of OEM sensors, an OEM satellite communication system, and an OEM local communication system. The diagnostic port, OEM cameras, OEM sensors, OEM satellite communication system, and the OEM local communication system being in electric communication with the ECU. A cellphone is provided having a local communication system disposed therein. The cellphone is in wireless communication with the ECU. The cellphone is adapted to configure the ECU to enable operation of the OEM cameras in response to receipt by the cellphone of an alert signal from the OEM sensors, indicating that an intrusion is in process. The alert signals are representative of detection of a monitor event by one or more of the OEM sensors.

34 Claims, 2 Drawing Sheets

(56) References Cited

U.S. PATENT DOCUMENTS

| | | |
|---|---|---|
| 7,116,216 B2 | 10/2006 | Andreasen |
| 7,117,075 B1 | 10/2006 | Larschan et al. |
| 7,209,813 B2 | 4/2007 | Namaky |
| RE39,619 E | 5/2007 | Andreasen |
| D545,223 S | 6/2007 | Chen |
| D558,621 S | 1/2008 | Rich |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| D610,586 S | 2/2010 | Chen |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 8,019,503 B2 | 9/2011 | Andreasen |
| 8,024,083 B2 | 9/2011 | Chenn |
| D646,188 S | 10/2011 | Chen |
| D646,599 S | 10/2011 | Chen |
| 8,032,277 B2 | 10/2011 | Larschan et al. |
| 8,032,419 B2 | 10/2011 | Chen |
| 8,055,403 B2 | 11/2011 | Lowrey et al. |
| 8,068,951 B2 | 11/2011 | Chen et al. |
| 2003/0151507 A1* | 8/2003 | Andre et al. ............ 340/539.13 |
| 2004/0140885 A1 | 7/2004 | Slicker et al. |
| 2004/0257208 A1 | 12/2004 | Huang et al. |
| 2006/0192659 A1 | 8/2006 | Fazio |
| 2007/0005201 A1* | 1/2007 | Chenn ............................ 701/29 |
| 2007/0213895 A1* | 9/2007 | Nakayama .................... 701/29 |
| 2008/0004764 A1 | 1/2008 | Chinnadurai |
| 2008/0079554 A1* | 4/2008 | Boice ............................ 340/436 |
| 2008/0119981 A1 | 5/2008 | Chen |
| 2008/0249681 A1 | 10/2008 | Bertosa et al. |
| 2009/0066488 A1* | 3/2009 | Qiahe et al. ................ 340/426.1 |
| 2009/0276115 A1 | 11/2009 | Chen |
| 2009/0326757 A1 | 12/2009 | Andreasen |
| 2010/0174446 A1 | 7/2010 | Andreasen |
| 2010/0194884 A1 | 8/2010 | Plaster |
| 2011/0109450 A1 | 5/2011 | Hirschfeld et al. |
| 2011/0112932 A1 | 5/2011 | Chen |
| 2011/0195701 A1 | 8/2011 | Cook et al. |
| 2011/0224866 A1 | 9/2011 | Chen |
| 2011/0264322 A1 | 10/2011 | Chen |
| 2012/0001755 A1 | 1/2012 | Conrady |
| 2012/0010775 A1* | 1/2012 | Chenn ........................ 701/31.5 |

\* cited by examiner

CELLPHONE CONTROLLABLE CAR INTRUSION RECORDING AND MONITORING REACTION SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a vehicle intrusion system and, more particularly, to an OEM based intrusion system that is reportable to and controllable by a user's cellphone.

Various types of vehicle alarm systems have been used for many years. The original equipment manufacturers (OEM's) market alarm systems that utilize OEM sensor systems, power couplings, switching circuits, and alarms (e.g. horns). Such OEM systems monitor for events, such as door openings and generate an alarm signal when a monitored event occurs while the alarm is on an on state. Where the vehicle includes a satellite communication system, the occurrence of a monitored event may activate the satellite communication system, to advise to remote monitoring station of the intrusion and other information, such as the location of the vehicle. Where the satellite communication system supports bi-directional communication, the remote monitoring station may direct the vehicle electronic control unit (ECU) to take appropriate steps, such as disabling the vehicle at its then current location.

Aftermarket vehicle alarm systems commonly utilize separate sensors, controllers, communication systems, and alarms. Such aftermarket alarm systems are commonly connected to a vehicle power circuit and may also be connected to some of the OEM vehicle sensors, typically at the sensor output.

Aftermarket vehicle alarm systems are not limited to OEM sensors or communication systems, and thereby permit greater flexibility in the functionality of the alarm system. However, the cost of such systems may be substantial and professional installation is frequently required. Moreover, to the extent that such aftermarket alarm systems interface with the vehicle electrical system in a manner unintended by the OEM, the connection of such components may give rise to defects in the vehicle electrical system.

Accordingly, while aftermarket alarm systems allow for considerable flexibility in monitoring, communication, and other functions, it is desirable to utilize the existing resources of the vehicle sensor system, communication system, control system, etc. to implement such additional functionalities as much as possible to avoid unnecessary costs for components, installation, and communication services.

Fortunately, OEM vehicle sensing systems, communication systems, and control systems have evolved considerably during recent years. Vehicle sensors systems have evolved to include functionalities such as collision detectors, door open, truck open, seat sensors, GPS location, pedestrian detectors (infer-red, ultrasonic or millimeter wave radar), rear cameras, side cameras, top cameras, and interior motion detectors.

OEM systems have also become more readily accessible and configurable to implement additional functions. OEM vehicle communication systems include satellite communications circuits, local communication circuits (to interface with Wi-Fi, or Bluetooth network(s)), and cellphone connector ports.

The various OEM sensor systems and communication systems are generally controllable by the ECU, which can be configured to regulate the operation of the various sensors and communication devices to implement functionalities beyond those normally implemented by the various OEM sensors and communication systems.

The present invention recognizes and utilizes the flexibility of existing, the OEM systems to implement the functionalities offered in aftermarket alarm systems without the need to purchase and install additional sensors, controllers, alarms or communication systems. However, the present invention also allows the use of aftermarket sensors, particularly where the vehicle OEM systems do not support such functionality.

Further, in accordance with the present invention, data recording may be provided as an integral part of the intrusion system, e.g. to obtain images of the perpetrators and their activities. In one embodiment of the present invention OEM vehicle diagnostic data ports and/or OEM communications systems operate to facilitate data recording functions, either locally within the vehicle or remotely, at limited cost and with minimal, if any, installation requirements.

Accordingly, present invention is intended to provide a system and methodology for implementing an OEM based vehicle intrusion system which utilizes existing vehicle OEM sensors, communications systems, and control networks to provide a low cost intrusion detection system, having an enhanced capabilities and ease of use.

BRIEF SUMMARY

A cellphone controllable car intrusion system is provided. In one embodiment the system includes a vehicle OEM system, including an electronic control unit (ECU), a diagnostic port, a plurality of OEM cameras, a plurality of OEM sensors, an OEM satellite communication system, and an OEM local communication system. The diagnostic port, OEM cameras, OEM sensors, OEM satellite communication system, and the OEM local communication system being in electric communication with the ECU. A cellphone is provided having a local communication system disposed therein. The cellphone is in wireless communication with the ECU. The cellphone is adapted to configure the ECU to enable operation of the OEM cameras in response to receipt by the cellphone of an alert signal from the OEM sensors, indicating that an intrusion is in process. The alert signals are representative of detection of a monitored event by one or more of the OEM sensors. In other embodiments aftermarket cameras, sensors or communication systems may be utilized to provide functionality that is unavailable from the vehicle.

A data storage device may be located in the vehicle or remote from the vehicle. The data storage device may communicate with the ECU via the vehicle diagnostic port, or the data storage device may be in wireless communication with the ECU.

The data storage device may wirelessly communicate with the ECU via the OEM satellite communication system or the OEM local communication system.

The cellphone is preferably adapted to direct the communication of information from the cameras to a data storage device, in response to commands entered by a cellphone user. The cellphone commands may direct the communication of information from one or more of the cameras to one or more of a plurality of data storage devices.

The OEM cameras may be disposed of various locations in the vehicle, such as in the front bumper, in one or more of the side view mirrors, or in the rear surface of the vehicle. Other OEM sensors may include door opening sensor, truck opening sensor, a seat occupied sensor, a collision detection sensor, and a global positioning sensor (GPS).

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The following description is presented to enable one of ordinary skill in the art to make and use of the present invention, as provided within the context of a particular application and its requirements. Various modifications to the preferred embodiment will, however, will be apparent to one skilled in the art and the general principles defined herein may be applied to other embodiments. Therefore, the present invention is not intended to be limited to the particular embodiment shown and described herein, but it is to be accorded the widest scope consistent with principles and novel features herein disclosed.

Figure 1:
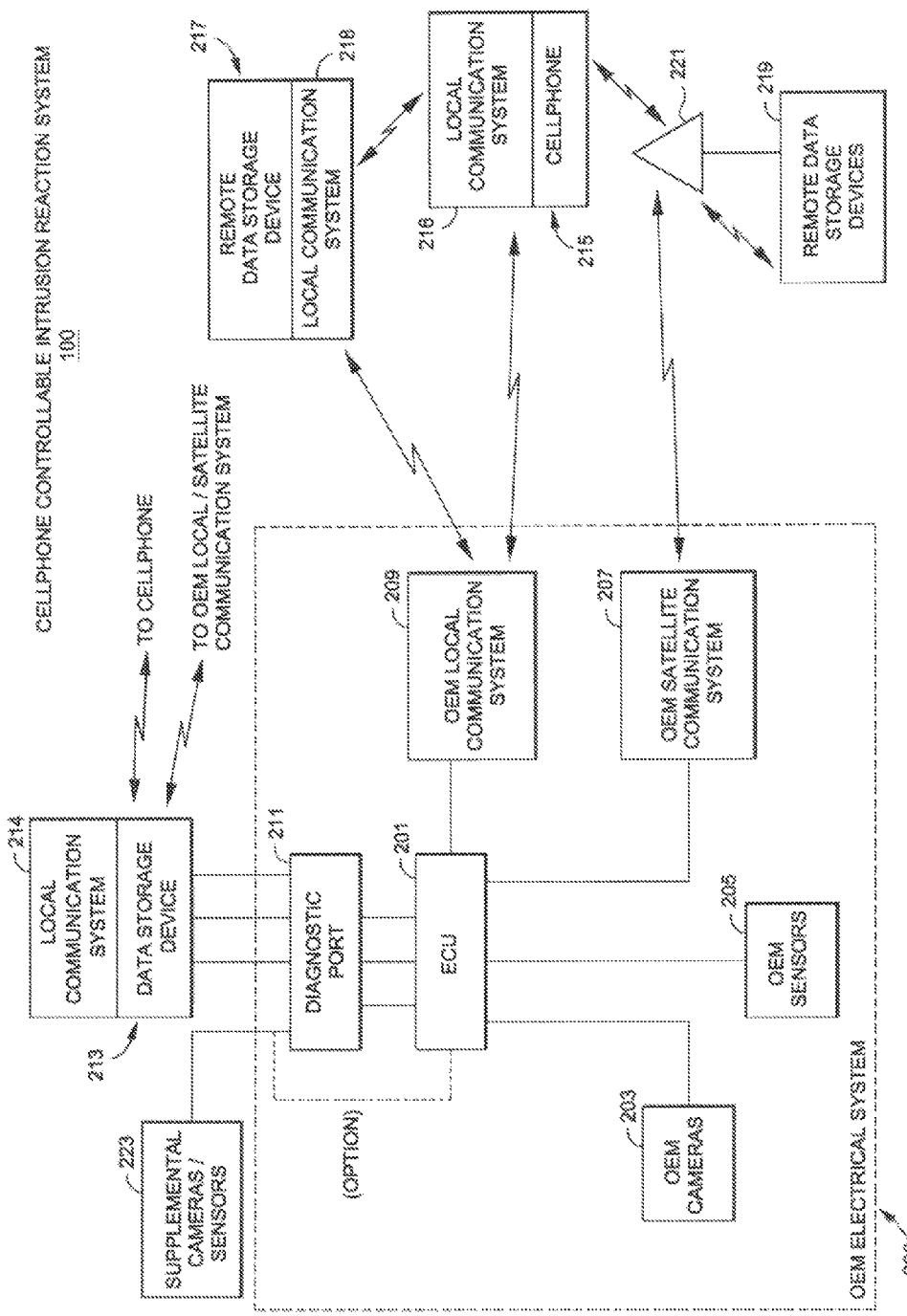
FIG. 1 is a schematic diagram of an exemplary intrusion reaction system in accordance with the one embodiment of the present invention.

FIG. 1 is a block diagram of one embodiment of a cellphone controllable intrusion reaction system. The intrusion reaction system 100 includes OEM system 200, configured to support the functionality of the system as described below.

The OEM system 200 may interface with other resources, to provide an alert signal, indicating detection of a monitored event, and to communicate event related data (live or stored) to a remote location. The event related data may provide information such as the identification of the monitored sensor, the date/time of the detected event, the geographic location of the vehicle, or video data captured by one or more cameras mounted on the exterior or interior of the vehicle.

In some cases, the event related data may be stored within the ECU for later downloading. However, in many cases it is desirable to promptly communicate the detection of a monitored event to the vehicle owner or other designated person, to allow for steps such as notification of police, disabling the vehicle, etc. In such case the monitored event may be communicated through an OEM local communication system or OEM satellite communication system, to a designated cellphone or other remote facility.

Where the event related data exceeds the ECU data storage capacity, such data may be communicated to either a data storage device connected to the vehicle diagnostic port, an onboard data storage device hard wired to the ECU, an onboard data storage device in wireless communication with the OEM local communication system, a cellphone in wireless communication with the OEM local communication system, a cellphone in wireless communication with the OEM satellite communication system, or some other remote storage/controlled facility in wireless communication with the OEM satellite communication system or the cellphone.

Referring to FIG. 1, an exemplary cellphone controllable intrusion reaction system 100 is shown. The system is centered on exemplary vehicle OEM electrical system 200 configured to implement the functions of the present invention. OEM system 200 includes an electric control unit (ECU) 201, in electrical communication with OEM cameras 203, OEM sensors 205, OEM satellite communication system 207, OEM local communication system 209, and diagnostic port 211.

OEM cameras 203 may include cameras mounted at various locations on the vehicle. Front cameras may be installed in the bumper of the vehicle. Side cameras may be installed in the side view minors, and a rear camera may be disposed proximate the rear license plate. OEMs such as BMW include such cameras, at the locations specified, on vehicles such as the 2012 BMW 7 Series model.

OEM sensors 205 may be implemented in a variety of forms. Such sensors commonly include a door opening sensor, a trunk opening sensor, a seat occupied sensor, a collision detection sensor, and a global positioning sensor (GPS). Additional sensors, available on various vehicles, such as the 2012 BMW 7 Series model, include an interior motion detecting sensor and pedestrian/vehicle detection sensors, which may be implemented as infra-red, ultrasonic and/or millimeter wave radar systems. The OEM sensors 205 are configured to detect a triggering event, such as a vehicle intrusion/break-in, an accident or other notable event.

Additional sensors may be added as desired. However, in order to minimize cost and installation efforts, OEM sensors are primarily, if not exclusively used.

When a vehicle break-in or other monitored event occurs, the OEM sensors 205 generate a responsive output signal, which is communicated to the ECU 201. The ECU 201 may respond to the sensor output in various ways. For example, the ECU may generate an output signal indicating the nature of the detected event, which may be communicated to diagnostic port 211, OEM local communication system 209, and/or OEM satellite communication system 207. The ECU 201 may store information representative of the detected event, with date and time information appended thereto. Additionally/alternatively, the ECU 201 may output the information to an on-board data storage unit 213, which may be connected to OEM diagnostic port 211. Additionally/alternatively, the on-board data storage unit 213 may be constructed to include a local communication system, such as Wi-Fi™ or Bluetooth™, which communicates with the ECU 201 via OEM local communication system 209. In this embodiment the on-board data storage unit 213 need not be engaged to the diagnostic port, and can be located discreetly in the vehicle, where it may be less likely to be detected by an intruder.

The OEM local communication system 209 may communicate information from the ECU to cellphone 215, which may also include a local communication system. In yet another embodiment, the cellphone 215 may receive information from the ECU via a local communication system resident in on-board data storage unit 213. Cellphone 215 incorporates an internal memory which may store information and data therein.

Remote data storage device 217 is not an on-board data storage unit, but can communicate with the ECU 201 via associated local communication system 218 or cellphone 215. For that purpose, cellphone 215 may communicate with OEM local communication system 209 by means of associated local communication system 216, or via satellite communication system 207.

Remote data storage device 217 may be located in a garage or other location where it can be in communication with OEM local communication system 209 and/or cellphone 215.

In yet another implementation, information from OEM sensors 205 may be communicated to a remote data storage device 219, via OEM satellite communication system 207 and transceiver 221. The transceiver 221 is representative of a multi-network hub that can communicate with the OEM system 200 via satellite link; can communicate with the cellphone 215 via a cellphone network; and can communicate with remote data storage device 219 via a cellphone network, a landline phone network, and/or the internet, from which the remote data storage device 219 is accessible.

Information/control signals from the remote data storage device 219 may be communicated to the OEM system 200, e.g. to configure the ECU 201 or request other information from OEM system 200, via one or more of OEM satellite communication system 207 and OEM local communication system 209/cellphone 215.

In one embodiment an intrusion event is detected by OEM sensors 205, and communicated to the vehicle owner via OEM local communication system 209 and cellphone 215. The vehicle owner may respond by configuring the ECU to activate and output information from one or more of OEM cameras 203, to be viewed by the vehicle owner on the cellphone display. The video data from the OEM cameras 203 may be also communicated to one or more of on-board data storage unit 213, remote data storage device 217 and remote data storage/control device 219. A service advisor located at remote data storage/control facility 219, or otherwise in communication with facility 219, can also access information from OEM cameras 203 and/or OEM sensors 205, and advise the vehicle owner and/or law enforcement officers of the situation.

As one of ordinary skill will recognize, the preferred data storage location of information may depend in part on the size of the data file. For example, storage of live data from OEM cameras 203 may require more storage space then is available in ECU 201 or cellphone 215. In such case, the video data would likely be stored in on-board data storage unit 213, remote data storage device 217 or remote data storage/control device 219. Similarly, the volume and resolution of data provided from OEM cameras 203 and OEM sensors 205 may necessitate the use of higher speed data transfer systems, which may not be available in certain links, such as links using OEM local communication system 209.

Accordingly, the OEM system 200, and in particular the ECU 201, may be configured to accommodate the operating characteristics and requirements of the OEM cameras 203 and OEM sensors 205, as well as the communication systems and associated devices, such as OEM local communication system 209, OEM satellite communication system 207, and cellphone 215.

It is understood that some of the OEM cameras 203, OEM sensors 205, OEM satellite communication system 207 and OEM local communication system 209 may be powered off when the car is turned off. However, in the event of an intrusion or other event, it is desirable to turn those components on. Therefore, one aspect of the present invention is directed toward providing a power-on signal to dormant OEM systems in response to a detected event when the vehicle is turned off.

When a vehicle is turned off, certain components or systems remain on, at least to a certain extent. For instance, the alarm system remains powered when the vehicle is off to detect a break-in. Therefore, one or more OEM cameras 203 or sensors 205 may be associated with a system which remains at least partially powered when the vehicle is off. When those OEM cameras 203 or sensors 205 detect a break-in or other monitored event, the output signal generated by those OEM cameras 203 or sensors 205 includes a power-on command which causes power to be sent to the other OEM cameras 203 and sensors 205 to deploy all available resources toward capturing the event. In one embodiment, the power-on command is communicated to the ECU, which in turn is programmable to respond to sets of circumstances, e.g. door open, alarm on, car off, by providing power to the dormant OEM cameras 203 and sensors 205 and recording devices.

Alternatively/Additionally application programs installed on cellphone 215 and/or at remote data storage/control facility 219 allow the user to selectively access and configure the ECU and components of OEM system 200, to capture and direct the transmission of data to various locations, such as to a police department or such other locations where the data can be acted upon or stored in secure conditions.

As noted above, the present invention allows for OEM systems to be configured to provide an enhanced intrusion reaction system, beyond the normal functionality of the OEM systems, with little or no additional on-board devices beyond the OEM systems. However, as one skilled in the art will recognize, where the vehicle has a less robust OEM system capacity, supplemental (aftermarket) internal or external cameras/sensors and associated switching circuitry may be provided, which communicates with the ECU 201, and may be monitored and controlled by ECU 201, programmed as described above and/or configured in response to application programs installed on cellphone 215 or in a remote data storage/control facility.

The supplemental cameras/sensors 223 are shown at FIG. 1, in electrical communication with ECU 201 via diagnostic port 211, or optional direct connection to ECU 201. In practice, the supplemental cameras/sensors 223 may be connected to the vehicle electrical control system in various ways other than through diagnostic port 211 or direct connection to ECU 201. Moreover, the inclusion of such supplemental cameras/sensors, while adding to the cost and installation requirements, does not detract from the boarder advantages of the present invention in relation to the configuration of existing OEM sensor components to implement enhanced sensor and communication functionality, including the ability to direct the configured system via applications running in a cellphone or in a remote data storage/control facility, and the related communication network.

In some cases the vehicle may incorporate a robust OEM system capacity, though the ability to reprogram/reconfigure the ECU to implement that capacity may be restricted by the vehicle manufacturer. In such as case, the features of the present invention may be implemented by either the use of supplemental internal or external cameras/sensors, and/or new addition of circuitry for bypassing the ECU and powering the onboard cameras/sensors, etc. in response to a detected event and/or in response to a receipt of a signal generated by an application program running in the supplemental circuitry, on cellphone 215 and/or on a remote storage/control facility.

Figure 2:
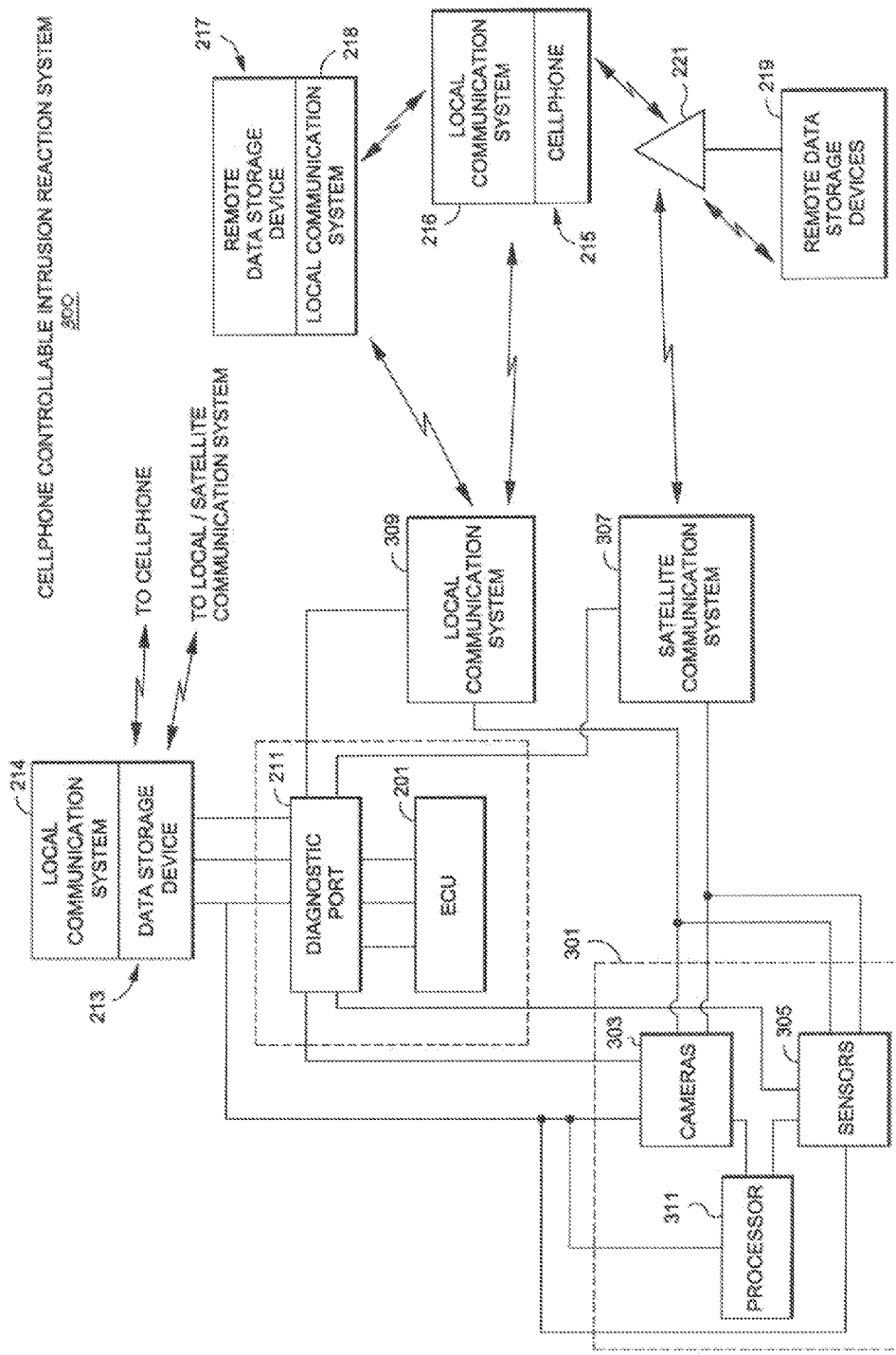
FIG. 2 is a schematic diagram of an exemplary intrusion reaction system in accordance with another embodiment of the present invention.

Referring now specifically to FIG. 2, there is shown another embodiment of the cellphone controllable intrusion reaction system 300 which is suitable for use in relation to less robust vehicle systems, or where the ability to reprogram/reconfigure the ECU is restricted by the vehicle manufacturer. The system 300 minimizes interaction with the ECU 201 and which relies more on aftermarket detection equipment, rather than relying on OEM equipment, as described in the embodiments above. In this regard, it is understood that it may be difficult to configure the ECU 201 to perform certain tasks. Thus, certain embodiments may operate primarily independent of the ECU 201 or may utilize the ECU to merely obtain a "triggering signal" associated with a triggering event to initiate data recording.

The monitoring and recording system shown in FIG. 2 includes a monitoring unit 301 including one or more aftermarket cameras 303 and sensors 305 connected to the vehicle. The cameras 303 may be mounted to the vehicle and may capture images within the vehicle, as well as outside of the vehicle. The camera(s) 303 may include an internal power source, i.e., battery, or alternatively may connect to the vehicle's power source to receive power therefrom. The cameras 303 may be exclusively aftermarket cameras installed on a previously existing vehicle, or alternatively, the vehicle may include a combination of OEM cameras and aftermarket cameras 303. In this embodiment, the aftermarket cameras 303 may supplement the cameras already located on the vehicle to provide enhanced monitoring. The aftermarket cameras 303 may also be configured to operate independent of the vehicle's ECU 201. In this regard, if the vehicle is turned off, the aftermarket cameras 303 may continue to monitor the vehicle, even if the OEM cameras are programmed to turn off when the vehicle is off.

The monitoring and recording unit 301 may also include a data storage unit 213 in communication with the cameras 303 to store the images captured by the cameras 303. The data storage device 213 may be configured to record over old data if no triggering event occurs within a certain period of time. For instance, the data storage device 213 may be configured to store 30 minutes of data, such that if no triggering event has occurred within 30 minutes, the oldest data is recorded over. Other data storage techniques may also be used to store critical data, while deleting or not storing data which does not appear to be critical. For instance, the data storage device 213 may include a short term storage unit which "buffers" data until a triggering event occurs, at which time the data is transferred to a long term storage unit.

The monitoring and recording system 300 additionally includes a processor 311 in communication with the monitoring unit 301, the data recording device 213 and the vehicle ECU 201. The processor 311 is in communication with the ECU 201 to sense the presence of the triggering event. The triggering event may be detected in several different ways depending on the systems and resources available at any given time. When the vehicle is operational, data from the vehicle's systems and resources may be used to detect a triggering event. For instance, speed, acceleration/deceleration, voltage changes, etc. may be used to detect an accident or other triggering event when the vehicle is operational. However, when the vehicle is parked and turned off, only certain resources may be available for detecting the triggering event. For instance, the vehicle's alarm may remain operational and may include a motion sensor or vibration sensor which may detect intrusion.

What is claimed is:

1. A cellphone controllable car intrusion system comprising:
    a vehicle OEM electrical system including an electronic control unit (ECU), a diagnostic port, a plurality of OEM cameras, a plurality of OEM sensors, an OEM satellite communication system, and an OEM local communication system, the diagnostic port, OEM cameras, OEM sensors, OEM satellite communication system and the OEM local communication system being in electrical communication with the ECU,
        the OEM cameras including a plurality of OEM cameras disposed to encompass multiple fields of view about the vehicle;
        the ECU being operative to communicate information from the OEM cameras to a data storage device;
        the data storage device being in wireless communication with the ECU; and
    a cellphone having a cellphone local communication system disposed therein, the cellphone being in wireless communication with ECU;
        the cellphone being adapted to configure the ECU to enable operation of the OEM cameras in response to receipt of an alert signal by the cellphone from the OEM sensors, communicated to the cellphone via the ECU, indicating that an intrusion is in process, the alert signal being representative of detection of a monitored event by one or more of the OEM sensors.

2. The intrusion reaction system as recited in claim 1, wherein the OEM cameras include at least one front facing camera, at least one side facing camera, and at least one rear facing camera.

3. The intrusion reaction system as recited in claim 1, wherein the data storage device is disposed in the vehicle.

4. The intrusion reaction system as recited in claim 3, wherein the data storage device communicates with the ECU via the OEM local communication system.

5. The intrusion reaction system as recited in claim 3, wherein the data storage device communicates with ECU via the vehicle diagnostic port.

6. The intrusion reaction system as recited in claim 1, wherein the data storage device is located remote from the vehicle.

7. The intrusion reaction system as recited in claim 6, wherein the data storage device communicates with the ECU via the OEM satellite communication system.

8. The intrusion reaction system as recited in claim 6, wherein the data storage device communicates with the ECU via the cellphone, a transceiver and the OEM satellite communication system.

9. The intrusion reaction system as recited in claim 6, wherein the data storage device is disposed at a website in communication with the ECU via the OEM satellite communication system.

10. The intrusion reaction system as recited in claim 6, wherein the data storage device is disposed at a website in communication with the ECU via the OEM local communication system.

11. The intrusion reaction system as recited in claim 10, wherein the OEM sensors further include an interior motion detecting sensor and a pedestrian/vehicle detection sensor.

12. The intrusion reaction system as recited in claim 1, wherein the cellphone is further adapted to direct the communication of information from the cameras to a data storage device.

13. The intrusion reaction system as recited in claim 1, wherein the cellphone is further adapted to selectively direct the communication of information from one or more of the cameras to one of a plurality of data storage devices.

14. The intrusion reaction system as recited in claim 1, wherein the OEM cameras include cameras disposed in the front bumper of the vehicle.

15. The intrusion reaction system as recited in claim 1, wherein the OEM cameras include cameras disposed in at least one side view mirror on the vehicle.

16. The intrusion reaction system as recited in claim 1, wherein the OEM cameras include cameras disposed in a rear surface of the vehicle.

17. The intrusion reaction system as recited in claim 1, wherein the OEM sensors include a door opening sensor, a truck opening sensor, a seat occupied sensor, a collision detection sensor and a global positioning sensor (GPS).

18. The intrusion reaction system as recited in claim 1, wherein the alert signal includes a power-on command communicated to the ECU to supply power to dormant ones of the plurality of OEM cameras, the plurality of OEM sensors, the OEM satellite communication system, and the OEM local communication system when the vehicle is turned off.

19. The intrusion reaction system as recited in claim 1 wherein the information representative of the status and operation of the sensors is obtained by the ECU from the sensors, and communicated from the ECU to the cellphone.

20. The intrusion reaction system as recited in claim 19 wherein the ECU regulates operation of the sensors in response to input signals from the cellphone.

21. The intrusion reaction system as recited in claim 19 further comprising a data storage device for storing information from the sensors, the data storage device being connectable to a car diagnostic port.

22. The intrusion reaction system as recited in claim 21 wherein the data storage device communicates with the ECU via the car diagnostic port.

23. The intrusion reaction system as recited in claim 22 wherein the local communication system is in electrical communication with the car diagnostic port, the local communication system further being in wireless communication with the cellphone.

24. The intrusion reaction system as recited in claim 21 wherein the local communication system is in electrical communication with the data storage device.

25. The intrusion reaction system as recited in claim 24 wherein the local communication system communicates with the ECU via the car diagnostic port.

26. The intrusion reaction system as recited in claim 24 wherein the local communication system is in wireless communication with the ECU.

27. A cellphone controllable car intrusion system comprising:
   an electrical intrusion system including a plurality of cameras and a plurality of sensors, the plurality of cameras being configured to capture images of multiple fields of view about the vehicle, the plurality of sensors being able to detect an intrusion event and generate an intrusion signal in response thereto;
   a storage and transmission device in operative communication with the electrical intrusion system to store the images captured by the plurality of cameras, the storage and transmission device having a local communication system configured to transmit an alert signal in response to receipt of the intrusion signal; and
   a cellphone having a cellphone local communication system disposed therein, the cellphone being in wireless communication with the storage and transmission device;
   the cellphone being adapted to configure the storage and transmission device to enable operation of the plurality of cameras in response to receipt of the alert signal by the cellphone.

28. The intrusion system as recited in claim 27, wherein the plurality of sensors includes at least two from the group comprising: motion sensors, sound sensors, brightness sensors, and vibration sensors.

29. The intrusion system as recited in claim 27, wherein the plurality of cameras are configured to capture images at regular time intervals.

30. The cellphone controllable car intrusion system as recited in claim 27 wherein the storage and transmission device communicates with the electrical intrusion system via an electronic control unit (ECU).

31. A cellphone controllable car intrusion system comprising:
   a vehicle OEM electrical system including an electronic control unit (ECU), a diagnostic port, a plurality of OEM cameras, a plurality of OEM sensors, an OEM satellite communication system, and an OEM local communication system, the diagnostic port, OEM cameras, OEM sensors, OEM satellite communication system and the OEM local communication system being in electrical communication with the ECU; and
   a cellphone having a cellphone local communication system disposed therein, the cellphone being in wireless communication with ECU;
   the cellphone being adapted to configure the ECU to enable operation of the OEM cameras in response to receipt of an alert signal by the cellphone from the OEM sensors, communicated to the cellphone via the ECU, indicating that an intrusion is in process, the alert signal including a power-on command communicated to the ECU to supply power to dormant ones of the plurality of OEM cameras, the plurality of OEM sensors, the OEM satellite communication system, and the OEM local communication system when the vehicle is turned off.

32. A cellphone controllable car intrusion system comprising:
   a vehicle OEM electrical system including an electronic control unit (ECU), a diagnostic port, a plurality of OEM cameras, a plurality of OEM sensors, an OEM satellite communication system, and an OEM local communication system, the diagnostic port, OEM cameras, OEM sensors, OEM satellite communication system and the OEM local communication system being in electrical communication with the ECU;
   a cellphone having a cellphone local communication system disposed therein, the cellphone being in wireless communication with ECU; and
   a data storage device for storing information from the sensors, the data storage device being connectable to the diagnostic port;
   the cellphone being adapted to configure the ECU to enable operation of the OEM cameras in response to receipt of an alert signal by the cellphone from the OEM sensors, communicated to the cellphone via the ECU, indicating that an intrusion is in process;
   information representative of the status and operation of the sensors is obtained by the ECU from the sensors, and communicated from the ECU to the cellphone;
   the local communication system being in electrical communication with the data storage device;
   the local communication system communicates with the ECU via the car diagnostic port.

33. A cellphone controllable car intrusion system comprising:
   a vehicle OEM electrical system including an electronic control unit (ECU), a diagnostic port, a plurality of OEM cameras, a plurality of OEM sensors, an OEM satellite communication system, and an OEM local communication system, the diagnostic port, OEM cameras, OEM sensors, and the OEM satellite communication system being in electrical communication with the ECU;
   a cellphone having a cellphone local communication system disposed therein, the cellphone being in wireless communication with ECU; and a data storage device for storing information from the sensors, the data storage device being connectable to the diagnostic port;

the cellphone being adapted to configure the ECU to enable operation of the OEM cameras in response to receipt of an alert signal by the cellphone from the OEM sensors, communicated to the cellphone via the ECU, indicating that an intrusion is in process;

information representative of the status and operation of the sensors is obtained by the ECU from the sensors, and communicated from the ECU to the cellphone;

the local communication system being in electrical communication with the data storage device;

the local communication system is in wireless communication with the ECU.

34. A cellphone controllable car intrusion system comprising:

a vehicle electrical system including an electronic control unit (ECU), a diagnostic port, a plurality of cameras, a plurality of sensors, a satellite communication system, and a local communication system, the diagnostic port, cameras, sensors, satellite communication system and the local communication system being in electrical communication with the ECU, the cameras including a plurality of cameras disposed to encompass multiple fields of view about the vehicle;

the ECU being operative to communicate information from the cameras to a data storage device;

the data storage device being in wireless communication with the ECU; and a cellphone having a cellphone local communication system disposed therein, the cellphone being in wireless communication with ECU;

the cellphone being adapted to configure the ECU to enable operation of the cameras in response to receipt of an alert signal by the cellphone from the sensors, communicated to the cellphone via the ECU, indicating that an intrusion is in process, the alert signal being representative of detection of a monitored event by one or more of the sensors.

* * * * *